United States Patent
Babu et al.

(10) Patent No.: US 12,008,488 B2
(45) Date of Patent: Jun. 11, 2024

(54) SYSTEMS AND METHODS TO MANAGE SUB-CHART DEPENDENCIES WITH DIRECTED ACYCLIC GRAPHS

(71) Applicant: SAP SE, Walldorf (DE)

(72) Inventors: Thejas Babu, Karnataka (IN); Vineet Singh, Delhi (IN)

(73) Assignee: SAP SE, Walldorf (DE)

( * ) Notice: Subject to any disclaimer, the term of this patent is extended or adjusted under 35 U.S.C. 154(b) by 264 days.

(21) Appl. No.: 17/745,329

(22) Filed: May 16, 2022

(65) Prior Publication Data
US 2023/0368055 A1 Nov. 16, 2023

(51) Int. Cl.
*G06N 7/01* (2023.01)
*G06F 8/41* (2018.01)
*G06F 9/455* (2018.01)

(52) U.S. Cl.
CPC ............... *G06N 7/01* (2023.01); *G06F 8/433* (2013.01); *G06F 8/445* (2013.01); *G06F 9/45558* (2013.01); *G06F 2009/4557* (2013.01)

(58) Field of Classification Search
USPC ........................................................ 717/154
See application file for complete search history.

(56) References Cited

U.S. PATENT DOCUMENTS

| | | | |
|---|---|---|---|
| 11,500,871 B1* | 11/2022 | Kulkarni | G06N 20/00 |
| 2022/0052933 A1* | 2/2022 | Bhatnagar | H04L 47/83 |
| 2022/0066813 A1* | 3/2022 | Taher | G06F 9/5038 |
| 2022/0222584 A1* | 7/2022 | Nimmagadda | G06N 20/00 |
| 2022/0269548 A1* | 8/2022 | Dwivedi | G06F 11/3006 |
| 2022/0350587 A1* | 11/2022 | Galgali | G06F 16/2365 |

\* cited by examiner

*Primary Examiner* — Qing Chen
*Assistant Examiner* — Clint Thatcher
(74) *Attorney, Agent, or Firm* — Buckley, Maschoff & Talwalkar LLC

(57) ABSTRACT

According to some embodiments, methods and systems may include a package manager chart file repository storing charts associated with a container orchestration system. A package manager platform, coupled to the package manager chart file repository, may access a first parent chart from the package manager chart file repository and determine that the first parent chart includes a dependency manifest. The package manager platform may then construct a Directed Acyclic Graph ("DAG") based on the dependency manifest. Container orchestration system objects, including those associated with sub-charts of the first parent chart, may then be deployed in accordance with a topological ordering of the DAG.

21 Claims, 14 Drawing Sheets

500

```
- name: parent-chart
    dag:
    charts:
    - name: A
    - name: B
        dependencies: [A]
    - name: C
        dependencies: [A]
    - name: D
        dependencies: [B, C]
```

FIG. 5

SYSTEMS AND METHODS TO MANAGE SUB-CHART DEPENDENCIES WITH DIRECTED ACYCLIC GRAPHS

BACKGROUND

A container orchestration system may help automate deployment, scaling, and/or management of containerized "applications." For example, a cloud-based application may help an enterprise generate purchase orders, implement Enterprise Resource Planning ("ERP") processes, perform Human Resources ("HR") functions, etc. The container orchestration system may group containers that make up an application into logical units for easy management and discovery. To help facilitate this, a collection of software tools called a "package manager" may automate the process of installing, upgrading, configuring, and removing computer programs in a consistent manner. The Helm package manager uses items called "charts" to create objects need to support an application. In some cases, however, some objects or charts may depend on other objects or charts. For example, a first chart may need to be successfully completed before a second chart is processed. It would therefore be desirable to provide a system and method to handle package manager chart dependencies in a secure and efficient manner.

SUMMARY

According to some embodiments, methods and systems may manage package manager chart dependencies. Embodiments may include a package manager chart file repository storing charts associated with a container orchestration system. A package manager platform, coupled to the package manager chart file repository, may access a first parent chart from the package manager chart file repository and determine that the first parent chart includes a dependency manifest. The package manager platform may then construct a Directed Acyclic Graph ("DAG") based on the dependency manifest. Container orchestration system objects, including those associated with sub-charts of the first parent chart, may then be deployed in accordance with a topological ordering of the DAG.

Some embodiments comprise means for accessing, by a computer processor of package manager platform, a first parent chart from a package manager chart file repository, wherein the package manager chart file repository stores charts associated with the container orchestration system; means for determining that the first parent chart includes a dependency manifest; means for constructing a DAG based on the dependency manifest; and means for deploying container orchestration system objects, including those associated with sub-charts of the first parent chart, in accordance with a topological ordering of the DAG.

Some technical advantages of some embodiments disclosed herein are improved systems and methods to provide a system and method to handle package manager chart dependencies in a secure and efficient manner.

BRIEF DESCRIPTION OF THE DRAWINGS

FIG. 5 is a dependency manifest in accordance with some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components, and circuits have not been described in detail so as not to obscure the embodiments.

One or more specific embodiments of the present invention will now be described. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
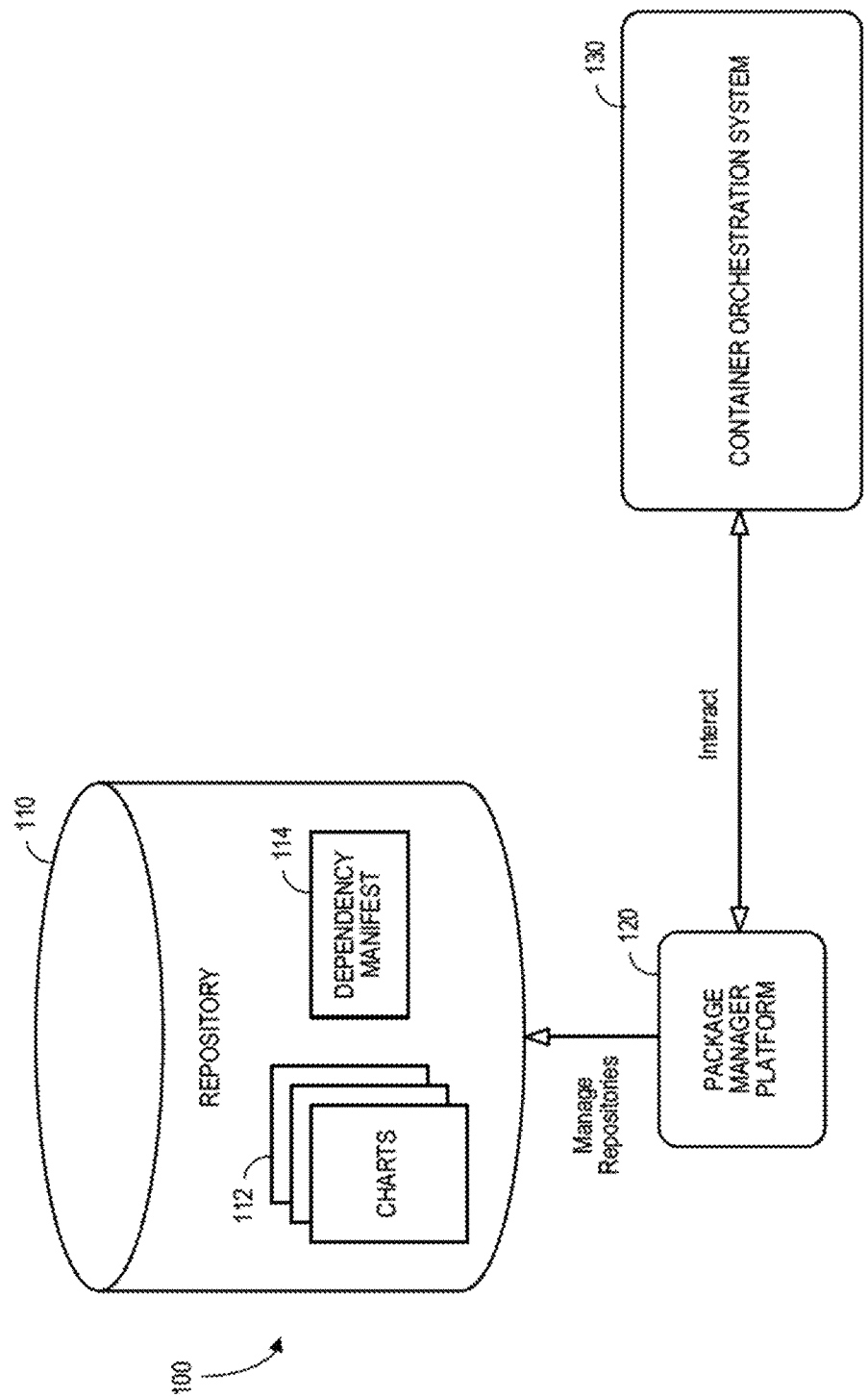
FIG. 1 is a high-level block diagram associated with a cloud-based computing system in accordance with some embodiments.

With the advent of container-based virtualization and the benefits that it provides in terms of portability, isolation, resource efficiency, organizations are rapidly migrating their workload to containers. With this migration, there arises a need to manage a large number of applications running in containers. FIG. 1 is a high-level block diagram associated with a cloud-based computing system 100 in accordance with some embodiments. The system 100 may include a package manager platform 120 that interacts with a container orchestration system 130. Moreover, the package manager platform 120 may automatically interact with a storage repository 110 that contains a number of charts 112. As will be described, according to some embodiments, the repository 110 further includes a dependency manifest 114. As used herein, the term "automatically" may refer to a process that is performed with little or no human intervention.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The package manager platform 120 may store information into and/or retrieve information from various data stores (e.g., the repository 110), which may be locally stored or reside remote from the package manager platform 120. Although a single package manager platform 120 is shown in FIG. 1, any number of such devices may be included. Moreover, various devices described herein might be combined according to embodiments of the present invention. For example, in some embodiments, the package manager platform 120 and repository 110 might comprise a single apparatus. The system 100 functions may be performed by a constellation of networked apparatuses, such as in a distributed processing or cloud-based architecture.

An administrator may access the system 100 via a remote device (e.g., a Personal Computer ("PC"), tablet, or smartphone) to view information about and/or manage operational information in accordance with any of the embodiments described herein. In some cases, an interactive Graphical User Interface ("GUI") display may let an operator or administrator define and/or adjust certain parameters via the remote device (e.g., to define mappings or add dependency information) and/or provide or receive automatically generated recommendations, reports, alerts, and/or results associated with the system 100.

Figure 2:
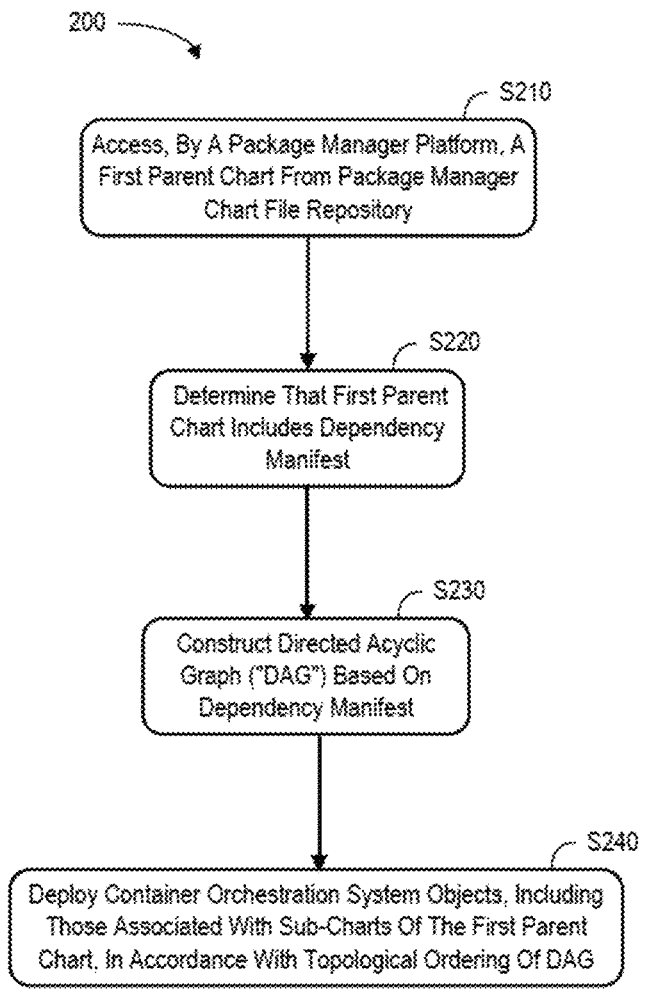
FIG. 2 is a package deployment method according to some embodiments.

FIG. 2 is a package deployment method 200 that might be performed by some or all of the elements of the system 100 described with respect to FIG. 1. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a computer processor of package manager platform may access a first parent chart from a package manager chart file repository. As used herein, the phrase "package manager" may refer to any collection of software tools that helps automate the process of installing, upgrading, configuring, and/or removing computer programs in a consistent manner. The package manager chart file repository stores charts associated with a container orchestration system. As used herein, the phrase "container orchestration system" may refer to, for example, tools to automate the operational effort required to run containerized workloads and services (e.g., to manage a container's lifecycle, including provisioning, deployment, scaling (up and down), networking, load balancing, etc.). At S220, the system may determine that the first parent chart includes a dependency manifest.

The system may then, at S230, construct a Directed Acyclic Graph ("DAG") based on the dependency manifest. As used herein, the phrase "DAG" may refer to a directed graph with no directed cycles. That is, a DAG includes vertices and edges (also called arcs), with each edge directed from one vertex to another. Moreover, following those directions will never form a closed loop. A DAG can be topologically ordered by arranging the vertices as a linear ordering that is consistent with all edge directions. Container orchestration system objects, including those associated with sub-charts of the first parent chart, may then be deployed in accordance with a topological ordering of the DAG at S240.

Figure 3:
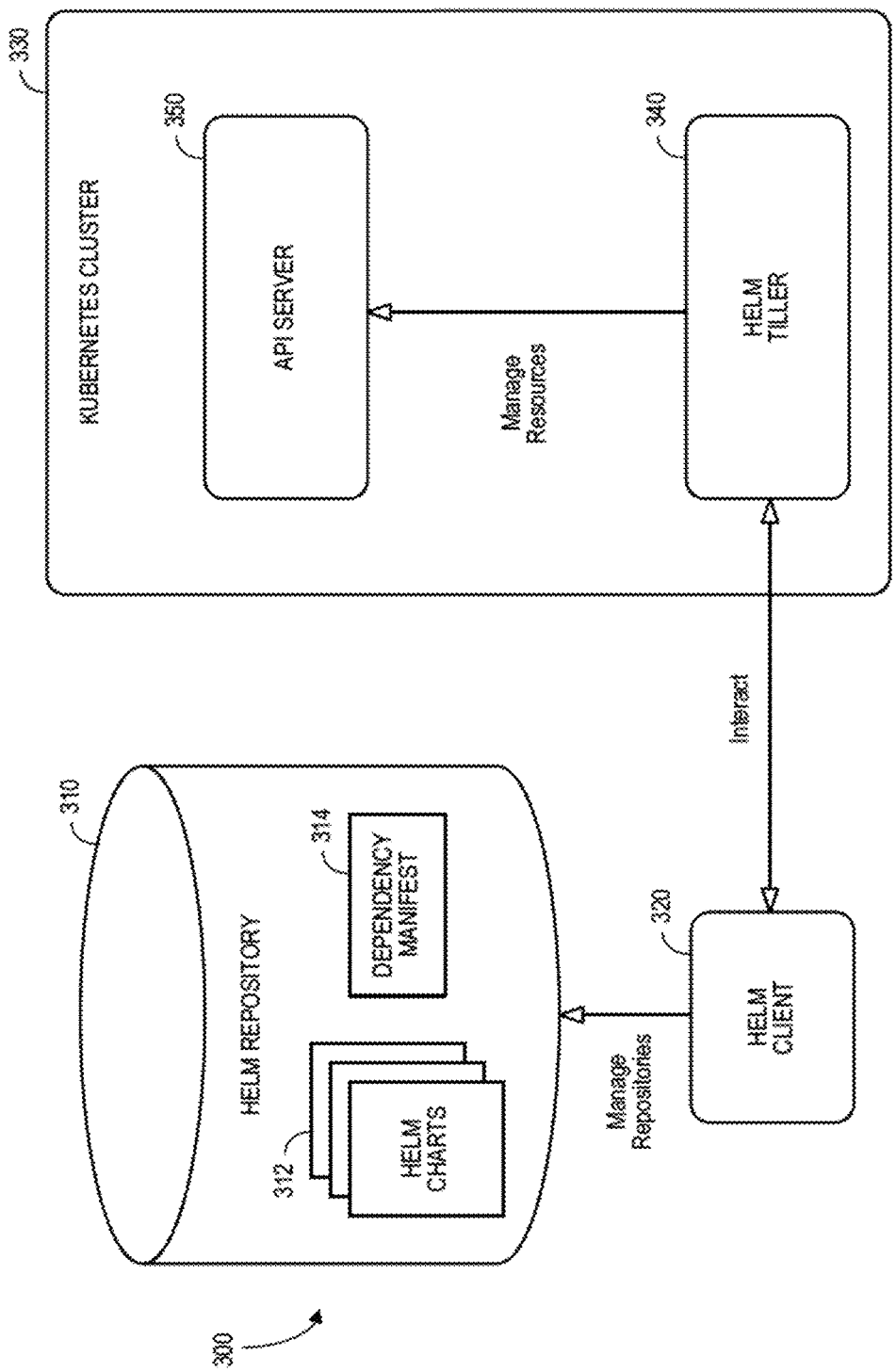
FIG. 3 is a more detailed block diagram of a system in accordance with some embodiments.

FIG. 3 is a more detailed block diagram of a system 300 in accordance with some embodiments. The system 300 include a Helm client 320 that interacts with a Kubernetes cluster 330. The Helm client 320 gives a developer a Command-Line Interface ("CLI") to work with charts, configs, release, repositories, etc. In particular, the Helm client 320 exchanges information with a Helm tiller 340 in the Kubernetes cluster 330 (e.g., to perform various actions such as install, upgrade, rollback, etc.). The Helm tiller 340 manages resources in connection with an API server 350 of the Kubernetes cluster 330. That is, the Helm tiller 340 may comprise an in-cluster server in the Kubernetes cluster 330, interacting with the Helm client 320 and communicating with the Kubernetes API server 350. Thus, Helm can easily manage Kubernetes with tasks such as install, upgrade, query, and remove for Kubernetes resources. The Helm client 320 also interacts with a Helm repository 310 that contains a number of Helm charts 312. The Helm repository 310 further includes a dependency manifest 314. The concept of sub-charts in Helm is currently being explored. In this case, a parent Helm chart 312 depends on several other Helm charts 312 which is treated as a single Helm release.

Containers and container orchestration systems such as the Kubernetes cluster 330 are widely used to deploy business applications in a cloud computing environment. Kubernetes provides the Application Programming Interface ("API") server 350 which the end users or clients can then use to deploy and configure their applications with Kubernetes. This lets a team build automation tools to deploy applications following the principles of infrastructure as code. Kubernetes resource objects can be created, updated, and/or deleted by writing multiple object configuration files (usually YAML files) and using the kubectl command-line tool. As the project needs grow, so does the Kubernetes configuration files which may need to be duplicated for several environments. One tool that helps the team manage complex Kubernetes applications is Helm, including the Helm client 320 and Helm tiller 340 which act as a package manager for Kubernetes—simplifying application management and creating a single package (knows as a Helm chart 312) that can be installed in the Kubernetes cluster 330. These Helm charts 312 contain the Kubernetes object configuration files ("values.yaml") which contain the values that is passed to a template. The Helm charts 312 can then be versioned and built once. That is, it can be used for multiple environments and could be shared with other teams. The Helm binary consists of a command line utility which provides multiple commands for installing, testing, uninstalling Helm charts 312 along with multiple other tasks. Helm also provides a way to extend the core feature set of Helm via plugins which acts like an add-on tools that integrate seamlessly with Helm. The Helm plugins can be written in any programming language and can be added or removed from a Helm installation without impacting the core Helm tool.

Currently, Helm's dependency lookup only considers the individual Kubernetes resources in each sub-chart 312 to determine the ordering. This approach may not suffice for scenarios where a specific ordering is required before deployment. Note that there is no in-built support in Helm to control the order of execution of a Helm chart 312 based on the nature of the dependencies. Moreover, complex Kubernetes applications often have dependencies between various sub-charts 312 that must be followed during deployment (e.g., components may have similar Kubernetes resources which can't be solved by the basic resource type ordering of Helm).

Figure 4:
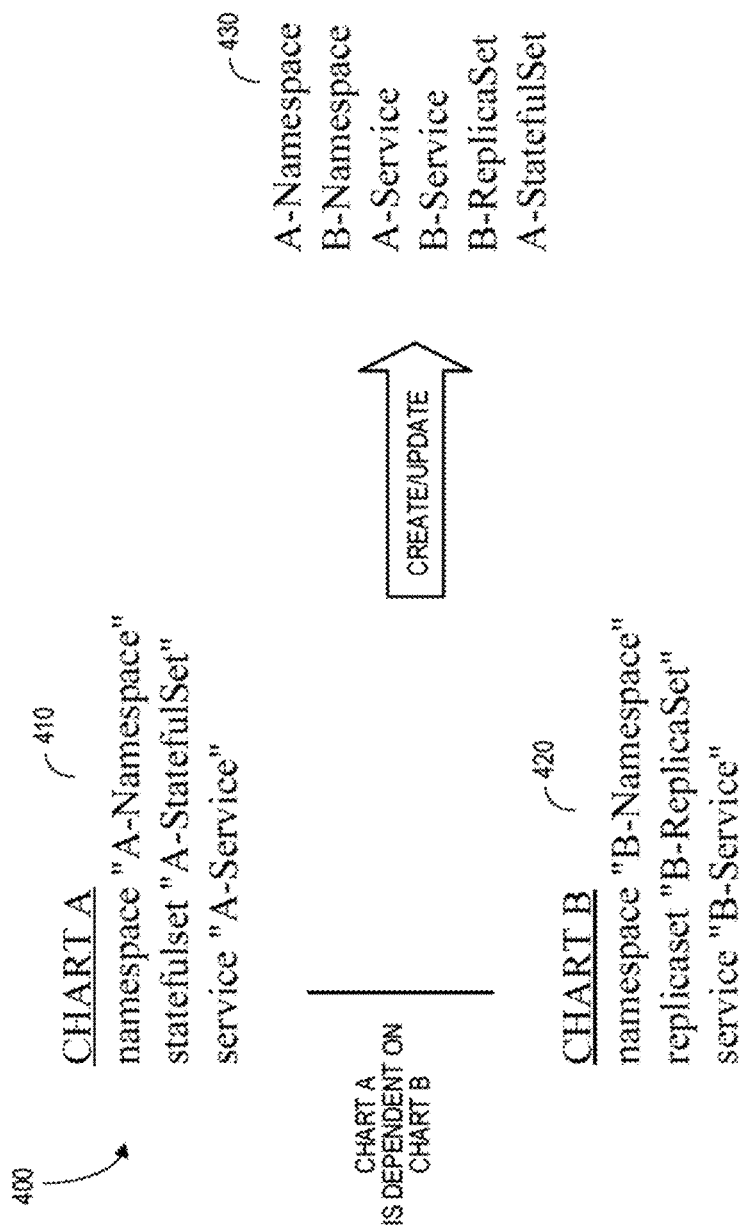
FIG. 4 illustrates chart deployment according to some embodiments.

For example, FIG. 4 illustrates 400 chart deployment according to some embodiments. In particular, a chart named "A" 410 creates the following Kubernetes objects:
namespace "A-Namespace"
statefulset "A-StatefulSet"
service "A-Service"

Furthermore, chart A 410 is dependent on chart B 420 that creates the following objects:
namespace "B-Namespace"
replicaset "B-ReplicaSet"
service "B-Service"

The release will create/update all of the above Kubernetes objects 430 in the following order:
A-Namespace
B-Namespace
A-Service
B-Service
B-ReplicaSet
A-StatefulSet There is no in-built support in Helm to control the order of execution of Helm chart based on the nature of the dependencies. A complex Kubernetes application will often have dependency between various sub-charts that needs to be followed during the time of deployment (e.g., which has similar Kubernetes resources and that which can't be solved by the basic resource type ordering of Helm). The workaround which multiple teams follow to solve the ordering problem is to build this dependency in a Continuous Integration/Continuous Delivery ("CI/CD") system. A developer may construct a deployment pipeline with this dependency embedded as tasks or stages to be executed in sequence or parallel (and each Helm sub-chart may be installed as a separate release.) Another way to solve this using Helm is to extend its plugin feature to develop a Helm plugin that handles the ordering of deployment and performs the rollout. The Helm plugin can be applied at the parent chart, which would contain a dependency manifest which determines dependency between the charts.

Referring again to FIG. 3, according to some embodiment, a Helm chart 312 can depend on another Helm chart 312 for deployments that require deployment of multiple stand-alone components. For this reason, Helm uses the concept of sub-charts 312, which has its own templates (and the parent chart can override values for the sub-chart 312). When Helm installs/upgrades charts 312, the Kubernetes objects from the chart and all of its dependencies are first aggregated into a single set. The objects are then sorted by their Kubernetes resource kind and are created (or updated) in that order. This creates a single Helm release for the chart 312 and of its dependencies. The install order of Kubernetes types may be given by the enumeration InstallOrder in kind_sorter.go.

Figure 6:
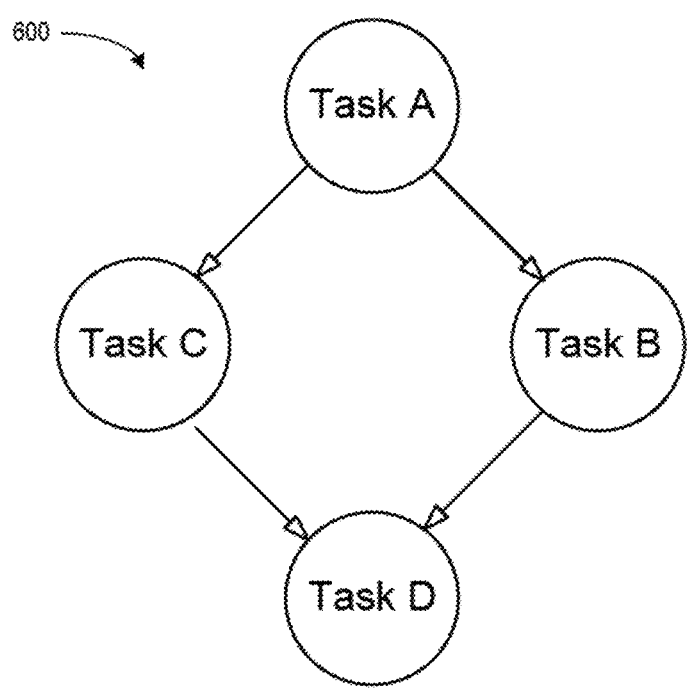
FIG. 6 illustrates task dependencies according to some embodiments.

The dependencies explicitly documented in the parent chart manifest 314 will let a plugin parse them and construct a DAG before the Helm release execution. The DAG can then dictate the ordering of sub-chart deployments. The dependency manifest 314 is first parsed by the Helm plugin and validated to form a DAG. The topological ordering of the DAG can be used produce the order of execution. For example, FIG. 5 is a dependency manifest 500 in accordance with some embodiments. The dependency manifest 500 (named "parent-chart") represents a diamond dependency, where chart A is deployed first and then chart B and C are deployed in parallel. After both B and C of these are deployed successfully, chart D can be deployed. This dependency manifest 500 may be validated, parsed, and a DAG is formed. For example, FIG. 6 illustrates 600 task dependencies as defined by the dependency manifest 500 of FIG. 5 according to some embodiments. The topological ordering of the DAG can produce the order of execution.

Figure 7:
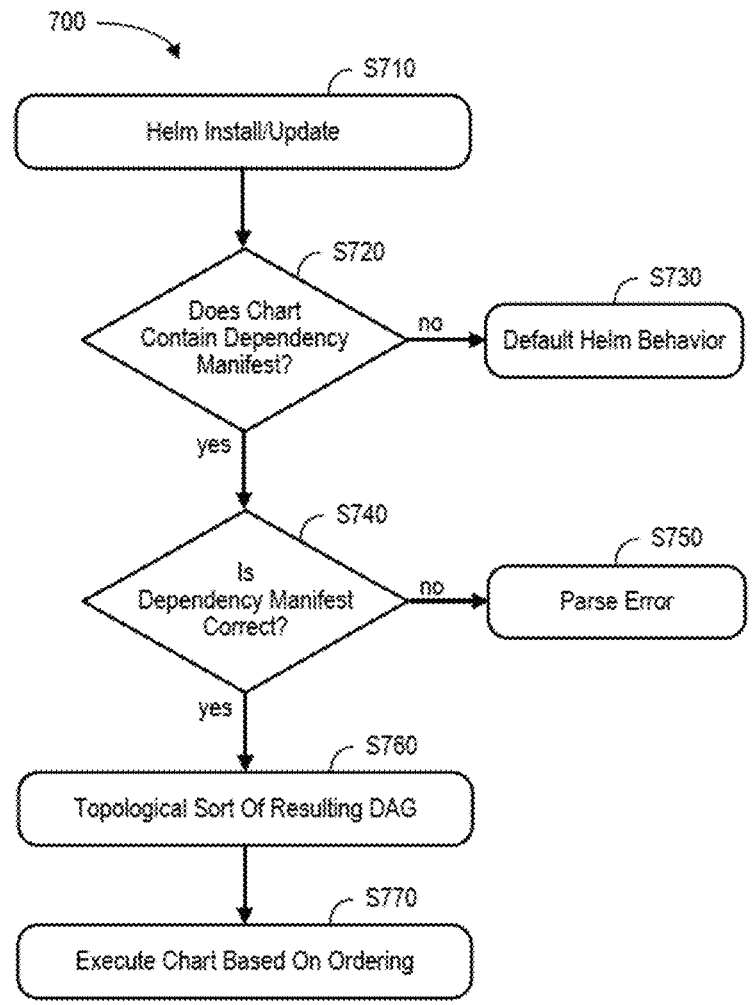
FIG. 7 is a workflow in accordance with some embodiments.

FIG. 7 is a workflow 700 in accordance with some embodiments. At S710, a Helm install/update is performed. If the chart does not contain a dependency manifest at S720, the default Helm behavior is performed at S730. If the chart does contain a dependency manifest at S720, it is determined if the dependency manifest is correct at S740. If the dependency manifest is not correct at S740, any errors may be parsed at S750. If the dependency manifest is correct at S740, a topological sort of a resulting DAG (as defined by the manifest) is performed at S760. The Helm chart may then be executed based on that ordering at S770.

Figure 8:
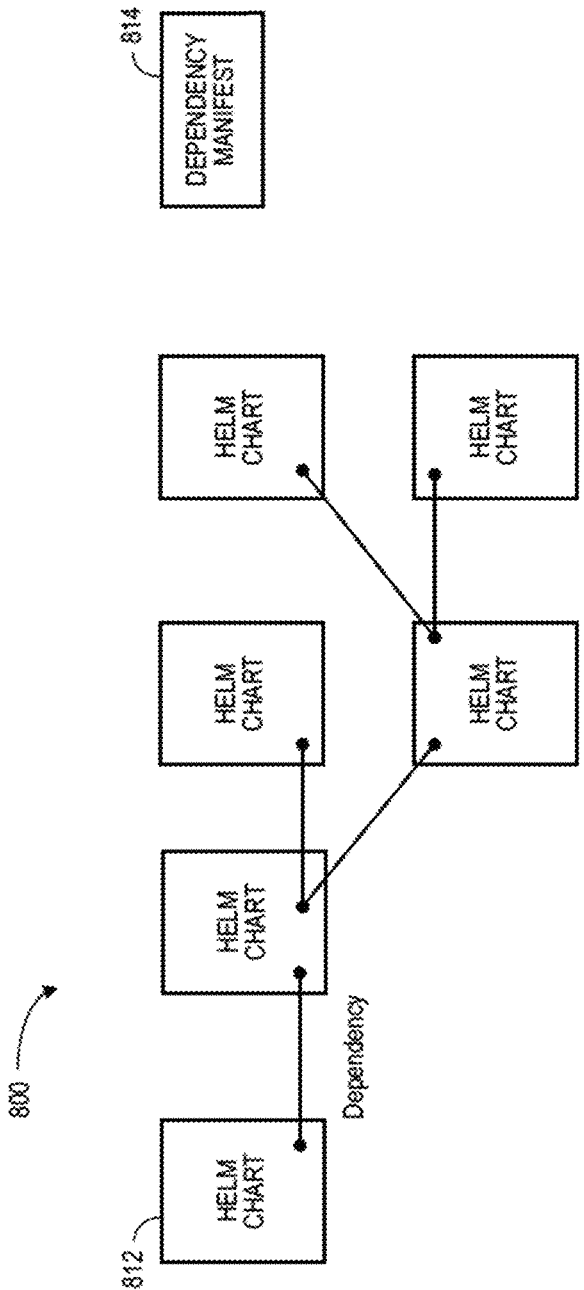
FIG. 8 is a illustrates sub-chart dependencies according to some embodiments.

According to some embodiments, nested structures/charts may be supported. For example, the system may be designed in way to allow deployment of complex charts having dependency on sub-charts (where a sub-chart may contain several other sub-charts, and each sub-charts may have its own dependency on resources). For example, FIG. 8 is a illustrates 800 sub-chart 812 dependencies and a dependency manifest 814 according to some embodiments. According to some embodiments, conditional deployment of sub-charts under a parent chart may be supported. In addition, embodiments may support both serial and parallel deployment of sub-charts.

Figure 9:
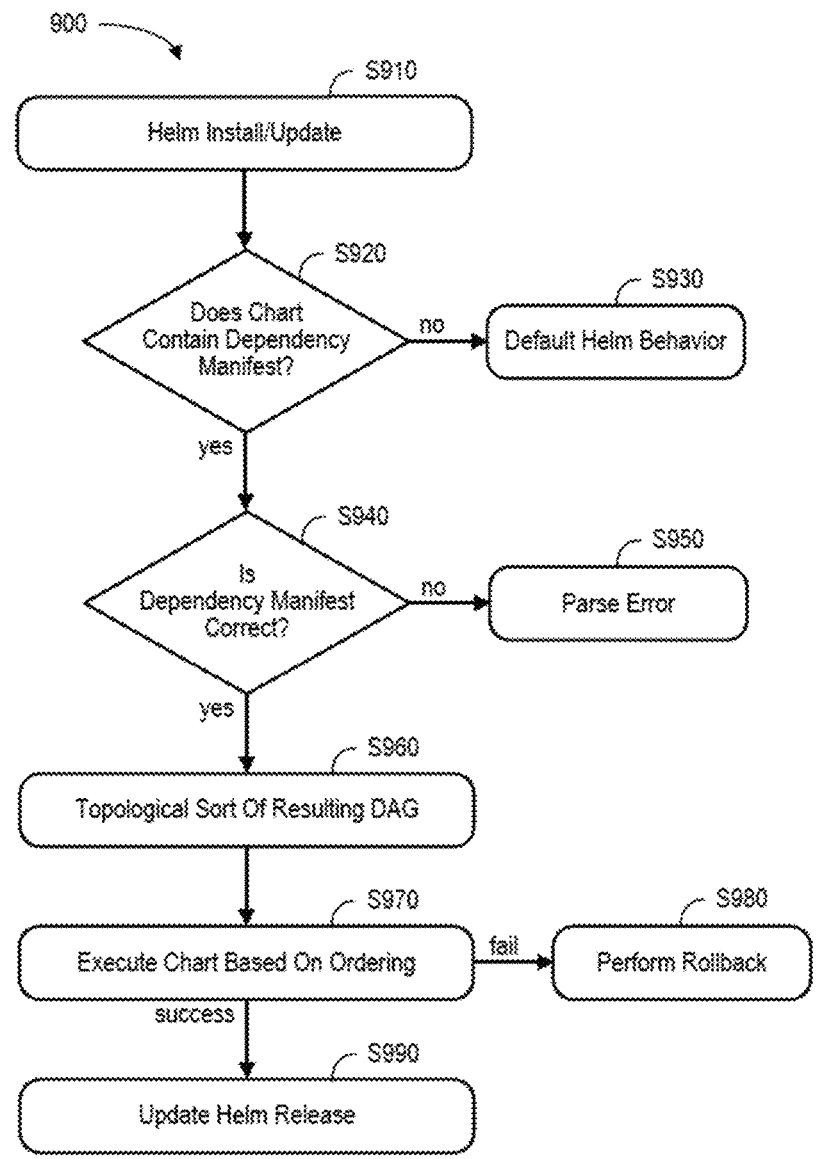
FIG. 9 is a workflow supporting rollback in accordance with some embodiments.

According to some embodiments, any desired rollback would be done in the reverse order of the topological ordering from the chart that failed, making sure the entire Helm release procedure is atomic. FIG. 9 is a workflow 900 supporting rollback in accordance with some embodiments. As before, at S910 a Helm install/update is performed. If the chart does not contain a dependency manifest at S920, the default Helm behavior is performed at S930. If the chart does contain a dependency manifest at S920, it is determined if the dependency manifest is correct at S940. If the dependency manifest is not correct at S940, any errors may be parsed at S950. If the dependency manifest is correct at S940, a topological sort of a resulting DAG (as defined by the manifest) is performed at S960. The Helm chart may then be executed based on that ordering at S970. If the executed chart is a success, the Helm release is updated at S990. When a failure occurs, a rollback may be performed at S980 (in the reverse order of the topological ordering).

Figure 10:
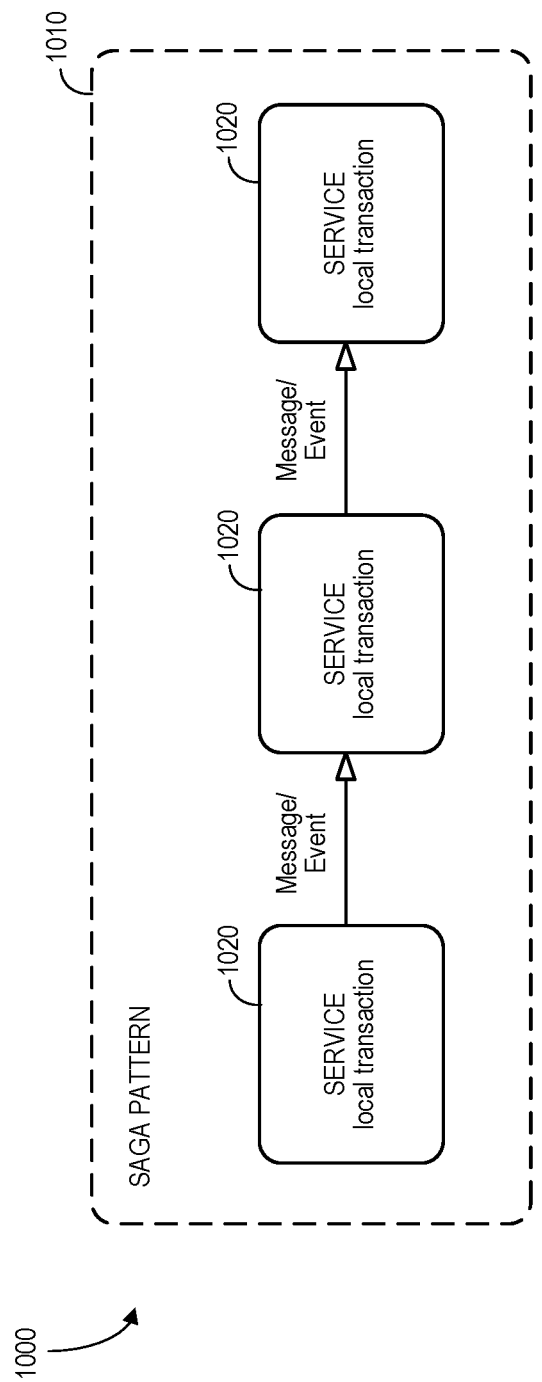
FIG. 10 is a saga system according to some embodiments.

According to some embodiments, when a failure is encountered while deploying a chart the tool may choose to tolerate the failure (or execute compensable measures to recover from the failure). Moreover, embodiments may support the inherent properties of operational atomicity and consistency of a distributed system. In addition, embodiments may be capable of executing compensating tasks in case of failure. For example, FIG. 10 is a saga system 1000 according to some embodiments including a saga pattern 1010. The saga pattern 1010 includes a number of services 1020 (e.g., local transactions) linked by messages/events. In this way, the saga pattern 1010 may provide transaction management using a sequence of local transactions. A local transaction is the atomic work effort performed by a saga participant. Each local transaction may, for example, update the database and publish a message or event to trigger the next local transaction in the saga pattern 1010. If a local transaction fails, the saga pattern 1010 executes a series of compensating transactions that undo the changes that were made by the preceding local transactions. Because embodiments described herein may support executing compensating tasks in case of failure, the support of saga patterns 1010 is inherent.

Figure 11:
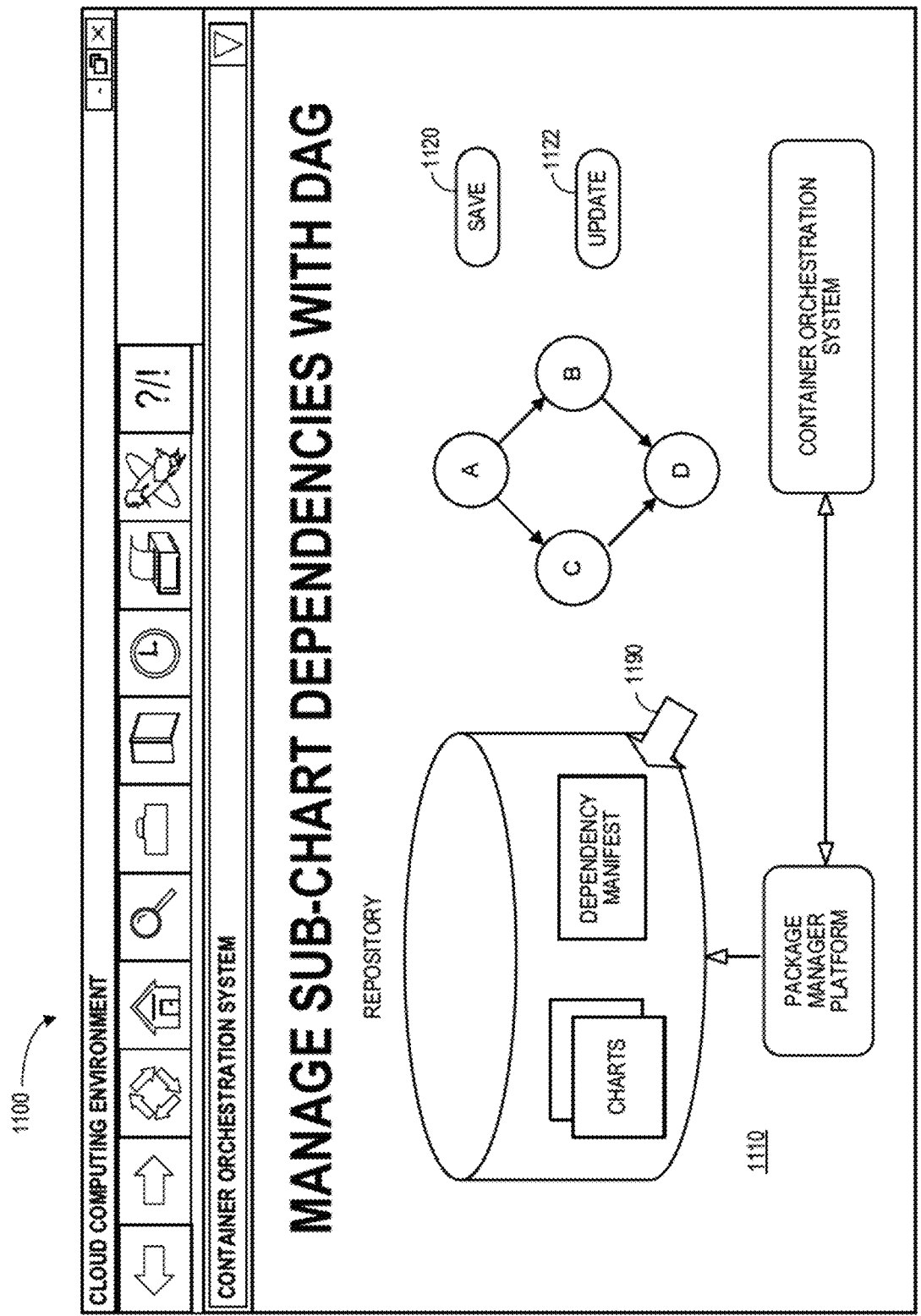
FIG. 11 is a package deployment display according to some embodiments.

FIG. 11 is a package deployment display 1100 according to some embodiments. The display 1100 includes a graphical representation 1110 or dashboard that might be used to manage sub-chart dependencies (e.g., for a cloud computing environment). In particular, selection of an element (e.g., via a touchscreen or computer mouse pointer 1190) might result in the display of a popup window that contains more detailed data. The display 1100 may also include a user selectable "Save" icon 1120 to store configurations and/or system mappings (e.g., to a particular repository) and an "Update" icon 1122 to adjust values as appropriate.

Figure 12:
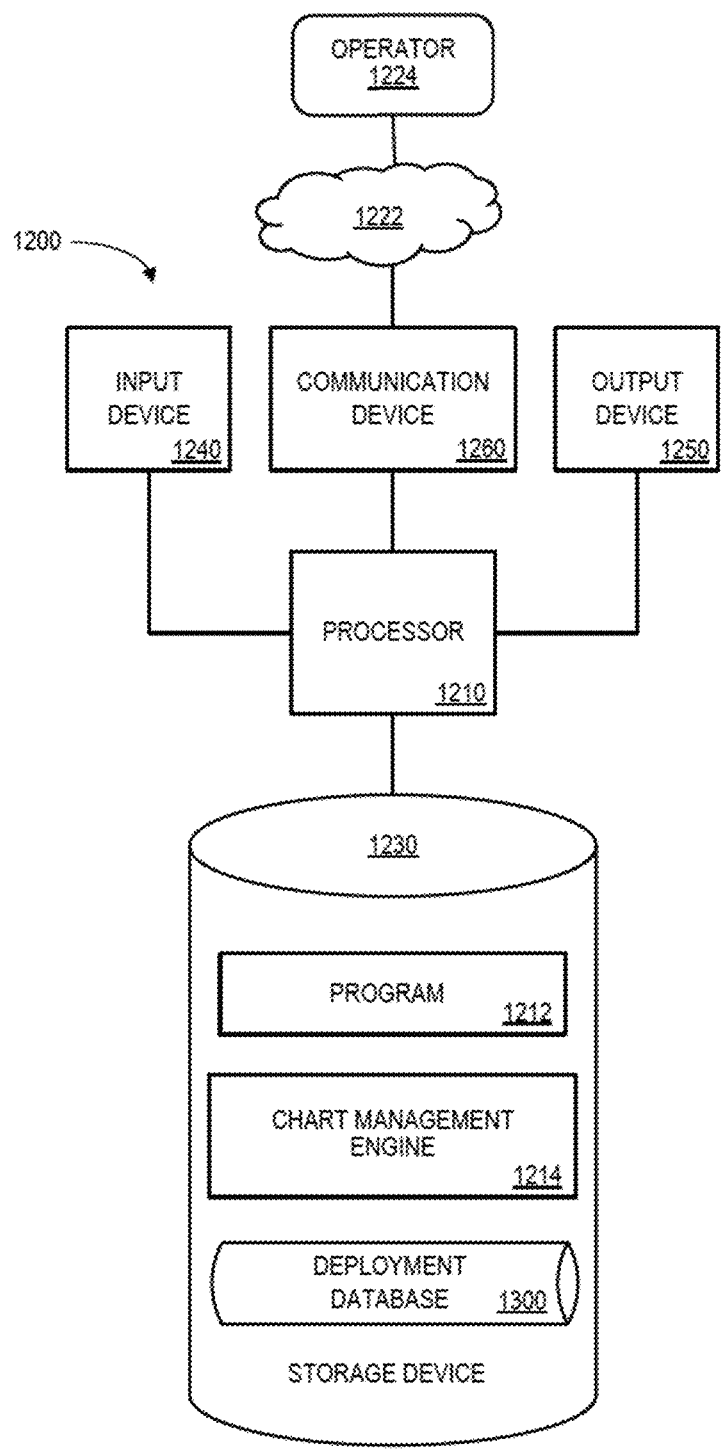
FIG. 12 is an apparatus or platform according to some embodiments.

Note that the embodiments described herein may be implemented using any number of different hardware configurations. For example, FIG. 12 is a block diagram of an apparatus or platform 1200 that may be, for example, associated with the systems 100, 300 of FIGS. 1 and 3, respectively (and/or any other system described herein). The platform 1200 comprises a processor 1210, such as one or more commercially available Central Processing Units ("CPUs") in the form of one-chip microprocessors, coupled to a communication device 1260 configured to communicate via a communication network (not shown in FIG. 12). The communication device 1260 may be used to communicate, for example, with one or more operators 1224 (e.g., via a communication network 1222), system administrators, development teams, etc. The platform 1200 further includes an input device 1240 (e.g., a computer mouse and/or keyboard to input, create and/or manage deployment information) and/or output device 1250 (e.g., a computer monitor to render a display, transmit recommendations, create reports about deployments, etc.). According to some embodiments, a mobile device and/or PC may be used to exchange information with the platform 1200.

The processor 1210 also communicates with a storage device 1230. The storage device 1230 may comprise any appropriate information storage device, including combinations of magnetic storage devices (e.g., a hard disk drive), optical storage devices, mobile telephones, and/or semiconductor memory devices. The storage device 1230 stores a program 1212 and/or chart management engine 1214 for controlling the processor 1210. The processor 1210 performs instructions of the programs 1212, 1214, and thereby operates in accordance with any of the embodiments described herein. For example, the processor 1210 may access a first parent chart from the package manager chart file repository and determine that the first parent chart includes a dependency manifest. The processor 1210 may then construct a DAG based on the dependency manifest. Container orchestration system objects, including those associated with sub-charts of the first parent chart, may then be deployed by the processor 1210 in accordance with a topological ordering of the DAG.

The programs 1212, 1214 may be stored in a compressed, uncompiled and/or encrypted format. The programs 1212, 1214 may furthermore include other program elements, such as an operating system, clipboard application, a database management system, and/or device drivers used by the processor 1210 to interface with peripheral devices.

As used herein, information may be "received" by or "transmitted" to, for example: (i) the platform 1200 from another device; or (ii) a software application or module within the platform 1200 from another software application, module, or any other source.

In some embodiments (such as the one shown in FIG. 12), the storage device 1230 further stores a deployment database 1300. An example of a database that may be used in connection with the platform 1200 will now be described in detail with respect to FIG. 13. Note that the database described herein is only one example, and additional and/or different information may be stored therein. Moreover, various databases might be split or combined in accordance with any of the embodiments described herein.

Figure 13:
FIG. 13 is a tabular portion of a deployment database in accordance with some embodiments.

Referring to FIG. 13, a table is shown that represents the deployment database 1300 that may be stored at the platform 1200 according to some embodiments. The table may include, for example, entries identifying tenant requests for database allocations in a cloud computing environment. The table may also define fields 1302, 1304, 1306, 1308, 1310 for each of the entries. The fields 1302, 1304, 1306, 1308, 1310 may, according to some embodiments, specify a deployment identifier 1302, chart identifiers 1304, a dependency manifest identifier 1306, a date and time 1308, and a status 1310. The deployment database 1300 may be created and updated, for example, when applications are deployed in a cloud computing environment, statuses are updated, etc.

The deployment identifier 1302 might be a unique alphanumeric label that is associated with a Kubernetes application deployment in a cloud computing environment. The chart identifiers 1304 may list various Helm charts and sub-charts associated with the deployment. The dependency manifest identifier 1306 may define dependencies of the deployment, and the date and time 1308 may indicate when the deployment occurred. The status 1310 might indicate that a deployment was successful, is in process, has been rolled back, etc.

Thus, embodiments may provide a system and method to handle package manager chart dependencies in a secure and efficient manner.

Figure 14:
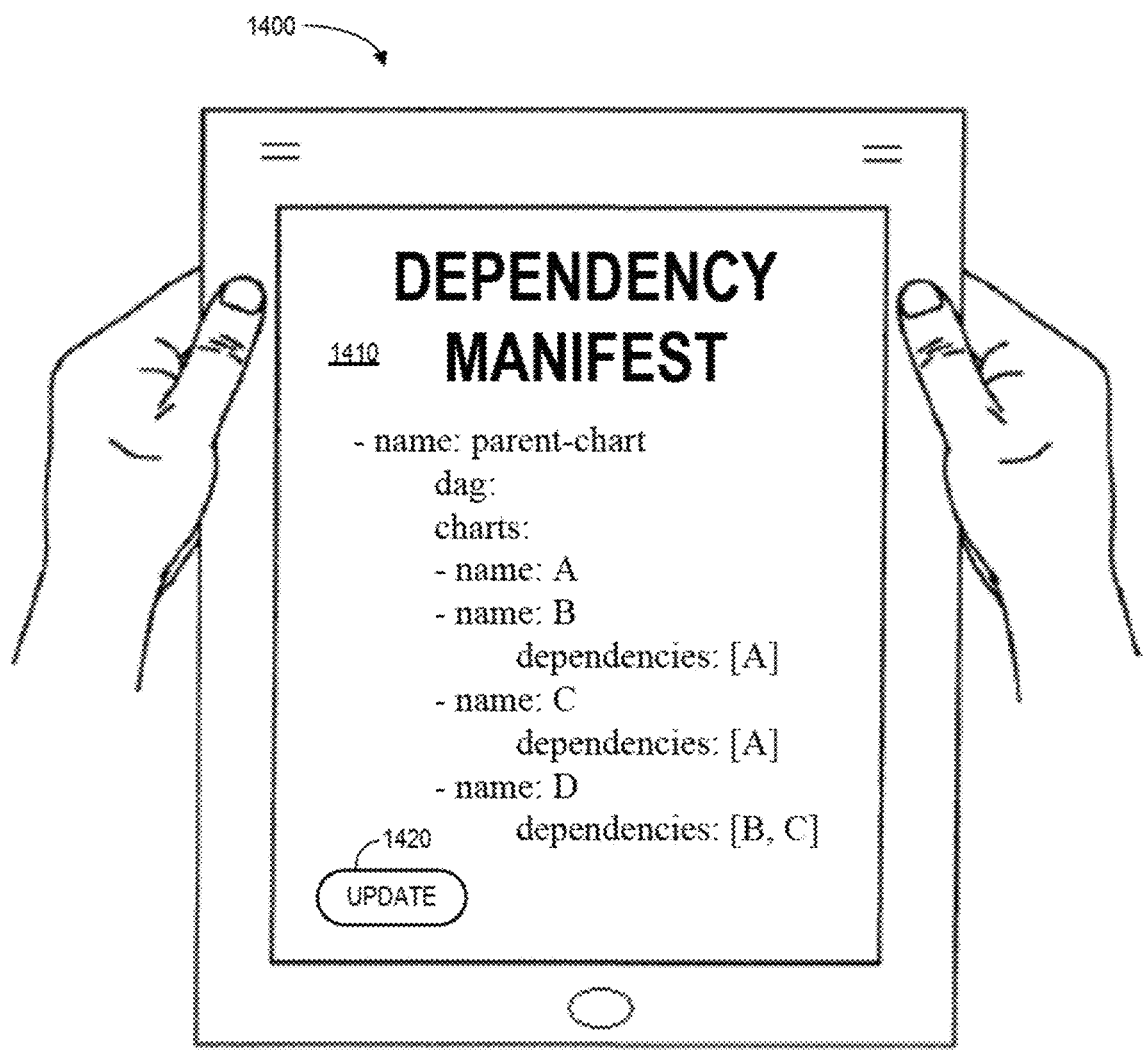
FIG. 14 illustrates a tablet computer according to some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of APIs, database allocation engines, operational intelligence, etc., any of the embodiments described herein could be applied to other designs. Moreover, the displays shown herein are provided only as examples, and any other type of user interface could be implemented. For example, FIG. 14 illustrates a tablet computer 1400 providing a package deployment display 1410 according to some embodiments. The display 1410 might be used, for example, to enter a dependency manifest for a cloud computing environment. Moreover, the display 1410 might be used to update and/or create Helm charts, sub-charts, deployment details, etc. via an "Update" icon 1420.

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A system to deploy packages for a container orchestration system, comprising:
   a package manager chart file repository storing charts associated with the container orchestration system; and
   a package manager platform, coupled to the package manager chart file repository, including:
   a computer processor, and
   a computer memory, coupled to the computer processor, storing instructions that, when executed by the computer processor, cause the package manager platform to:
   (i) access a first parent chart from the package manager chart file repository,
   (ii) determine that the first parent chart includes a dependency manifest,
   (iii) construct a Directed Acyclic Graph ("DAG") based on the dependency manifest, and
   (iv) deploy container orchestration system objects, including those associated with sub-charts of the first parent chart, in accordance with a topological ordering of the DAG.

2. The system of claim 1, wherein the container orchestration system comprises Kubernetes.

3. The system of claim 2, wherein the package manager platform is associated with Helm package manager charts.

4. The system of claim 3, wherein the dependency manifest is a YAML human-readable data-serialization language file.

5. The system of claim 3, wherein the DAG supports multi-layer and nested dependencies between charts.

6. The system of claim 3, wherein the DAG supports a priority of execution ordering of the dependencies.

7. The system of claim 3, wherein the DAG supports both serial and parallel task processing.

8. The system of claim 3, wherein the package manager platform supports a rollback in reverse order of the topological ordering responsive to a chart failure.

9. The system of claim 3, wherein the deployed container orchestration system objects are associated with at least one of: (i) a business application in a cloud computing environment, and (ii) a saga pattern of services.

10. A computer-implemented method to deploy packages for a container orchestration system, comprising:
    accessing, by a computer processor of package manager platform, a first parent chart from a package manager chart file repository, wherein the package manager chart file repository stores charts associated with the container orchestration system;
    determining that the first parent chart includes a dependency manifest;
    constructing a Directed Acyclic Graph ("DAG") based on the dependency manifest; and
    deploying container orchestration system objects, including those associated with sub-charts of the first parent chart, in accordance with a topological ordering of the DAG.

11. The method of claim 10, wherein the container orchestration system comprises Kubernetes.

12. The method of claim 11, wherein the package manager platform is associated with Helm package manager charts.

13. The method of claim 12, wherein the dependency manifest is a YAML human-readable data-serialization language file.

14. The method of claim 12, wherein the DAG supports multi-layer and nested dependencies between charts.

15. The method of claim 12, wherein the DAG supports a priority of execution ordering of the dependencies.

16. The method of claim 12, wherein the DAG supports both serial and parallel task processing.

17. The method of claim 12, wherein the package manager platform supports a rollback in reverse order of the topological ordering responsive to a chart failure.

18. The method of claim 12, wherein the deployed container orchestration system objects are associated with at least one of: (i) a business application in a cloud computing environment, and (ii) a saga pattern of services.

19. A non-transitory, computer-readable medium storing instructions, that, when executed by a processor, cause the processor to perform a method to deploy packages for a container orchestration system, the method comprising:
    accessing, by a computer processor of package manager platform, a first parent chart from a package manager chart file repository, wherein the package manager chart file repository stores charts associated with the container orchestration system;
    determining that the first parent chart includes a dependency manifest;
    constructing a Directed Acyclic Graph ("DAG") based on the dependency manifest; and
    deploying container orchestration system objects, including those associated with sub-charts of the first parent chart, in accordance with a topological ordering of the DAG.

20. The medium of claim 19, wherein the container orchestration system comprises Kubernetes.

21. The medium of claim 20, wherein the package manager platform is associated with Helm package manager charts.

* * * * *